US011309717B2

(12) United States Patent
Ramachandran et al.

(10) Patent No.: US 11,309,717 B2
(45) Date of Patent: Apr. 19, 2022

(54) APPARATUS AND METHOD FOR BATTERY MANAGEMENT

(71) Applicant: SAMSUNG ELECTRONICS CO., LTD., Suwon-si (KR)

(72) Inventors: Sanoop Ramachandran, Bangalore (IN); Ankit Yadu, Bangalore (IN); Krishnan Seethalakshmi Hariharan, Bangalore (IN); Periyasamy Paramasivam, Bangalore (IN); Jason Michael Battle, Wylie, TX (US); Suman Basu, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 470 days.

(21) Appl. No.: 15/636,899

(22) Filed: Jun. 29, 2017

(65) Prior Publication Data

US 2018/0090941 A1 Mar. 29, 2018

(30) Foreign Application Priority Data

Sep. 26, 2016 (IN) .............................. 201641032731
Dec. 30, 2016 (IN) .............................. 201641032731

(51) Int. Cl.
*H02J 7/00* (2006.01)
*H01M 10/44* (2006.01)
*H01M 10/48* (2006.01)

(52) U.S. Cl.
CPC ......... *H02J 7/00036* (2020.01); *H01M 10/44* (2013.01); *H01M 10/488* (2013.01); *H02J 7/0071* (2020.01); *H02J 7/00034* (2020.01)

(58) Field of Classification Search
CPC .............................. H02J 7/0004; H02J 7/0073

USPC ......................................................... 320/134
See application file for complete search history.

(56) References Cited

U.S. PATENT DOCUMENTS

| | | | | |
|---|---|---|---|---|
| 8,452,353 | B2 * | 5/2013 | Crawford | .......... H04W 52/0245 455/574 |
| 9,955,428 | B1 * | 4/2018 | Bacarella | .......... H04W 52/0258 |
| 2011/0078092 | A1 | 3/2011 | Kim et al. | |
| 2011/0248678 | A1 | 10/2011 | Wade et al. | |
| 2013/0119942 | A1 * | 5/2013 | Sutarwala | ........... H02J 7/00047 320/137 |
| 2013/0191662 | A1 * | 7/2013 | Ingrassia, Jr | ..... H04W 52/0277 713/320 |

(Continued)

FOREIGN PATENT DOCUMENTS

EP 1919060 A2 5/2008
WO 2013/163916 A1 11/2013

OTHER PUBLICATIONS

International Search Report and Written Opinion dated Nov. 15, 2017, issued by the International Searching Authority in International Application No. PCT/KR2017/008212 (PCT/ISA/210 & PCT/ISA/237).

(Continued)

*Primary Examiner* — Suchin Parihar
(74) *Attorney, Agent, or Firm* — Sughrue Mion, PLLC

(57) ABSTRACT

A Battery Management System (BMS) for an electronic device with bidirectional communication between The BMS and an Operating System (OS) of the electronic device for generating a charging pattern of charging the battery of the electronic device according to information received from the operating system.

31 Claims, 9 Drawing Sheets

(56) References Cited

U.S. PATENT DOCUMENTS

| | | | | |
|---|---|---|---|---|
| 2014/0082383 A1* | 3/2014 | De Cesare | ............ | G06F 1/3206 |
| | | | | 713/320 |
| 2014/0082384 A1* | 3/2014 | De Cesare | ............ | G06F 1/3206 |
| | | | | 713/320 |
| 2014/0292524 A1* | 10/2014 | Nallabelli | ............. | H02J 7/0047 |
| | | | | 340/636.1 |
| 2015/0077126 A1* | 3/2015 | Wang | .................... | H01M 10/48 |
| | | | | 324/428 |
| 2015/0123595 A1 | 5/2015 | Hussain et al. | | |
| 2015/0351037 A1* | 12/2015 | Brown | .............. | H04W 52/0261 |
| | | | | 455/574 |
| 2016/0064955 A1* | 3/2016 | Zuerner | .................. | H02J 7/007 |
| | | | | 705/39 |
| 2016/0064960 A1 | 3/2016 | DiCarlo et al. | | |
| 2016/0141893 A1 | 5/2016 | Lee et al. | | |
| 2016/0248266 A1* | 8/2016 | Ferrese | ................. | H02J 7/0003 |
| 2018/0284877 A1* | 10/2018 | Klein | .................... | G06F 1/3212 |

OTHER PUBLICATIONS

Droid Forums.net, "CPU Temperature", http://www.droidforums.net/threads/cpu-temperature.288446/, printed Feb. 28, 2017, total 10 pages.
Communication dated Sep. 23, 2019, issued by the European Patent Office in counterpart European Application No. 17853281.8.
Communication dated Nov. 11, 2019 issued by the Indian Patent Office in counterpart Indian Application No. 201641032731.
Communication dated Oct. 15, 2020, issued by the European Patent Office in European Application No. 17853281.8.
Communication dated Dec. 22, 2021 by the European Patent Office in European Patent Application No. 17853281.8.

* cited by examiner

APPARATUS AND METHOD FOR BATTERY MANAGEMENT

CROSS-REFERENCE TO RELATED APPLICATIONS

This application claims the priority under 35 U.S.C. § 119(a) from Indian Patent Application No. 201641032731 filed on Sep. 26, 2016, in the Indian Patent Office and Indian Patent Application No. 201641032731 filed on Dec. 30, 2016, in the Indian Patent Office, the disclosures of which are incorporated herein by reference in their entireties.

SUMMARY

1. Field of the Disclosure

Methods and apparatuses consistent with exemplary embodiments of the present application relate to an electronic device, and more particularly to a Battery Management System (BMS) in the electronic device.

2. Description of Related Art

Conventionally, a Battery Management System (BMS) constitutes a battery fuel gauge, which is an isolated hardware entity in an electronic device. In general, the BMS performs unidirectional communication with the other components of the electronic device, such as an Operating System (OS) of the electronic device. For example, the BMS may provide information pertaining to the battery of the electronic device, which may be displayed as a percentage of charge remaining on a display of the electronic device. The BMS, however, does not receive input from the electronic device.

Thus, there is a need for BMS which can perform bidirectional communication with other components of the electronic device to augment capabilities thereof.

Aspects of exemplary embodiments of the present application provide a battery management system (BMS) configured to perform bidirectional communication between with an Operating System (OS) of the electronic device.

Aspects of exemplary embodiments of the present application provide a BMS configured to obtain information of functional parameters of a battery in the electronic device, such as voltage, current, temperature, or the like.

Aspects of exemplary embodiments of the present application provide a BMS configured to obtain information of parameters pertaining to applications in the electronic device based on a user input, heuristic information, and ambience or surrounding environment of the electronic device.

Aspects of exemplary embodiments of the present application provide a BMS configured to obtain information of operational parameters of the electronic device such as current limit, processor temperature, or the like.

Aspects of exemplary embodiments of the present application provide a method of generating at least one pattern of charging the battery of the electronic device.

Aspects of exemplary embodiments of the present application provide a BMS configured to determine whether the battery of the electronic device can support the present and future power requirements of the electronic device.

Aspects of exemplary embodiments of the present application provide a BMS configured to monitor the functional parameters of the battery in the electronic device, application parameters in the electronic device based on user input, heuristic information, and ambience or surrounding environment and the operational parameters of the electronic device.

According to an aspect of an exemplary embodiment, there is provided a Battery Management System (BMS) for an electronic device configured to perform bidirectional communication between an Operating System (OS) of the electronic device. The BMS may obtain information of functional parameters of a battery in the electronic device. The functional parameters of the battery may include current, voltage, temperature, capacity, State of Charge (SoC), State of Health (SoH), or the like. The BMS may obtain information of parameters pertaining to applications in the electronic device based on a user input, heuristic information, ambience of the electronic device and operational parameters of the electronic device. The operational parameters of the electronic device may include current limit, thermal limit, processor temperature, charger temperature, minimum operating voltage, charger configuration settings, or the like. The BMS may generate a pattern of charging the battery of the electronic device. The charging pattern may be based on the information of at functional parameters of the battery, parameter pertaining to applications in the electronic device based on a user input, heuristic information, ambience of the electronic device and the operational parameters of the electronic device. The pattern of charging the battery of the electronic device may be a variation of rate of charging the battery of the electronic device.

Aspects of exemplary embodiments of the present application provide a charge pattern generator configured to monitor the information of the functional parameters of the battery of the electronic device, parameters pertaining to applications in the electronic device based on a user input, heuristic information, ambience of the electronic device and the operational parameters of the electronic device.

Aspects of exemplary embodiments of the present application provide a charge pattern generator is configured to cause display of the generated pattern on the screen of the electronic device. The charge pattern generator may detect an input performed by the user, in response to the generated pattern. The charge pattern generator may perform an action based on the input performed by the user. The action may correspond to charging the battery of the electronic device. The action may correspond providing a suggestion to the user indicating an optimal charging pattern. The action may correspond to a warning about occurrence of a potential safety hazard due to the battery of the electronic device.

Aspects of exemplary embodiments of the present application provide a charge pattern generator may obtain the parameters of the electronic device based on the user input, the heuristic information, the ambience of the electronic device and the operational parameters of the electronic device; from the OS of the electronic device.

According to an aspect of an exemplary embodiment, there is provided a BMS including a battery controller, connected to the battery of the electronic device, a charge pattern generator connected to the battery of the electronic device and an OS of the electronic device. The drivers of the electronic device may be connected to the battery controller and the charge pattern generator.

Aspects of exemplary embodiments of the present application provide a BMS configured to determine whether State of Charge (SoC) level of the battery serves a functionality of an electronic device. The BMS may be configured to cause to display a message indicating the user to charge the battery of the electronic device to continue serving the functionality of the electronic device, in response to determining that the SoC level of the battery is unable to serve the functionality of the electronic device. The BMS may be configured to control display of the message upon determining that the battery is not currently being charged.

According to an aspect of an exemplary embodiment, there is provided a computer program product comprising computer executable program code recorded on a non-transitory computer readable storage medium, which when executed causing an electronic device to execute a method including obtaining information of functional parameters of a battery in an electronic device, obtaining information of parameters pertaining to applications in the electronic device based on a user input, heuristic information, ambience of the electronic device and operational parameters of the electronic device, and generating a pattern of charging the battery of the electronic device.

According to an aspect of an exemplary embodiment, there is provided a method for managing a battery of an electronic device, the method comprising: obtaining information of functional parameters of the battery, obtaining information of current status of the electronic device and user activity; and generating at least one charging pattern to charge the battery based on the obtained information.

The method may further include obtaining heuristic information related to at least one of previous functional parameters of the battery, previous status of the electronic device and previous user activity to generate the at least one charging pattern further based on the heuristic information.

The method may further include determining a period of time during which the battery is capable of supporting operation of the electronic device based on the obtained information, to generate the charging pattern.

The method may further include notifying a user of a time to charge the battery of the electronic device based on the determined period of time.

The method may further include obtaining information of actual power management of the electronic device performed based on the generated charging pattern to be stored as one of the heuristic information.

Priorities may be set amongst the obtained information for generating the at least one charging pattern.

Charging pattern may include at least one of time, period, rate, interval and extent for charging of the battery and combinations therebetween.

The information of the current status of the electronic device may include at least one of parameter pertaining to applications in the electronic device, ambience of the electronic device and operational parameters of the electronic device and the information of the user activity may include at least one of actual time and period of charging the battery, time and period of using the electronic device and information inputted by the user through applications of the electronic device.

Accordingly, exemplary embodiments of the present application provide a Battery Management System (BMS) including a charge pattern generator configured to obtain information of functional parameters of a battery of an electronic device and configured to obtain information of current status of the electronic device and user activity, whereby at least one charging pattern to charge the battery is generated based on the obtained information.

The above and other aspects of the exemplary embodiments will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

In the accompanying drawings, like reference letters indicate corresponding parts in the various figures. The exemplary embodiments herein will be better understood from the following description with reference to the drawings, in which.

DETAILED DESCRIPTION OF EXEMPLARY EMBODIMENTS

Figure 1A:
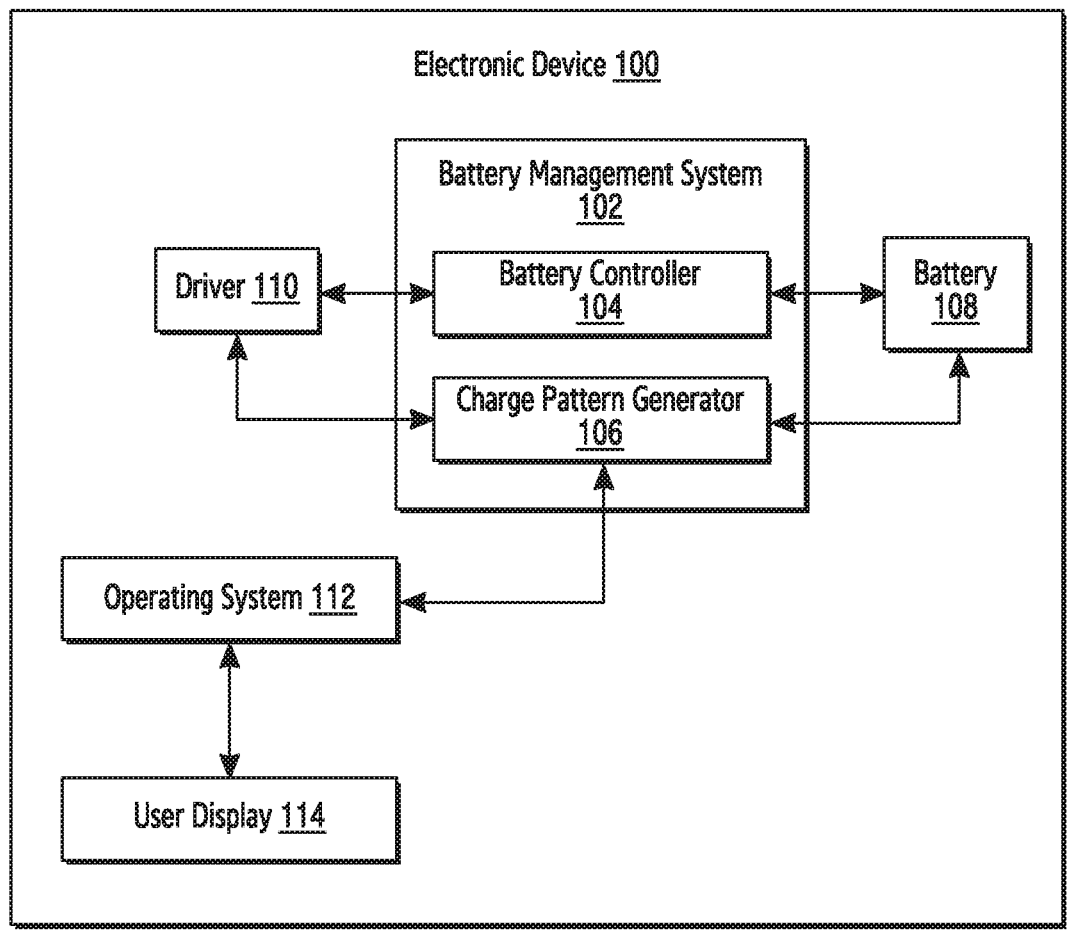
FIG. 1A illustrates a block diagram of a Battery Management System (BMS) implemented in an electronic device, according to an exemplary embodiment.

The exemplary embodiments herein are explained more fully with reference to the accompanying drawings and detailed in the following description. Descriptions of well-known components and processing techniques are omitted so as to avoid unnecessarily obscuring the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Throughout the description the terms pattern of charging the battery and charging pattern are used interchangeably.

Accordingly, the exemplary embodiments herein provide a Battery Management System (BMS), for an electronic device, having bidirectional communication capabilities for communicating with an Operating System (OS) of the electronic device.

The BMS may obtain information of functional parameters of a battery in the electronic device, information of parameter pertaining to applications in the electronic device based on a user input, heuristic information, ambience of the electronic device and operational parameters of the electronic device. The BMS may generate a pattern of charging the battery of the electronic device. The pattern of charging the battery of the electronic device may be a variation of rate of charging the battery of the electronic device.

The BMS may be configured to determine whether State of Charge (SoC) level of the battery supports a functionality of an electronic device. The BMS may cause display of a message indicating the user to charge the battery of the electronic device to continue serving the functionality of the electronic device, in response to determining that the SoC level of the battery is unable to serve the functionality of the electronic device. The BMS may be configured to display the message upon determining that the battery is in a state in which the battery is not currently being charged.

In an example, the battery models that can be employed include: a cell level model, which includes electrochemical modeling, i.e., modeling the processes of the battery; and a simplified model, which is derived from cell level models for state estimation. The simplified model utilizes equivalent electrical circuit model to realize the battery.

The usage of a particular type of model depends on the accuracy of realizing the battery and available computational resources. In an example, the estimated cell voltage using the simplified electrochemical model is based on the following equation:

$$V_{cell} = \underbrace{V_{ocv}(SOC)}_{\substack{\text{Open} \\ \text{circuit} \\ \text{potential}}} - \underbrace{IR_n}_{\substack{\text{Resistive} \\ \text{effects}}} - \underbrace{I_{SSf}R_{film}}_{\substack{\text{Degradation} \\ \text{effects}}} - \underbrace{\frac{R_g T}{\alpha F}\sinh^{-1}\left(\frac{I}{2I_N}\right) - \frac{R_g T}{\alpha F}\sinh^{-1}\left(\frac{I}{2I_p}\right)}_{\text{Charge transfer effects}}$$

The above equation describes a terminal voltage of a lithium ion battery ($V_{cell}$) in terms of certain internal characterization of the battery. It is the result of using a mathematical model (derived from a simplification of the lithium ion battery model). The first term on the right-hand side is an open circuit cell voltage, $V_{OCV}$. This quantity, in turn, is dependent on lithium ion concentration in electrodes, described by variable SOC (state-of-charge). The second term is an effective voltage drop due to resistive losses (such as contact resistance). The third term captures a voltage drop due to resistive film formation as a result of degradation of electrolyte material and deposition at the electrode (anode). This is also known as solid-electrolyte interphase (SEI) formation. This term is necessary to capture the battery degradation and the associated change in internal resistance. The last two terms are voltage as a result of charge-transfer at the anode and cathode. It is modeled via Butler-Volmer relation. The rest of the variables are model constants: $R_g$ is a universal gas constant, T is a temperature, $\alpha$ is a charge transfer coefficient, F is a Faraday's constant, I is an applied current, $I_N$ and $I_P$ are electrode characteristic constants which non-dimensionalize the intercalation current.

Unlike a conventional BMS, bidirectional communication between the BMS and the OS is possible, i.e., bidirectional communication takes place between the BMS and the OS of the electronic device.

The BMS may be scalable and interactive. This allows extension of life and capacity of the battery of the electronic device. The BMS may be flexible to a change of battery and may be dynamically tuned for any battery. The structure of the BMS enables accommodating different types of batteries, i.e., batteries with different capacities and chemistries.

A change in the battery requires a minor modification of the battery model parameters in the BMS. This allows flexible deployment of the BMS across different products.

The BMS may be easily migrated to other chips/devices, i.e. the BMS is independent of the chipset. Accordingly, the BMS is suitable for connected devices and Internet of Things (IoT).

The BMS allows adequate maintenance of the battery and allows remote implementation of updates and improvements.

The BMS is highly economical in comparison with a conventional BMS installed in an electronic device. The BMS enables improvement in hardware footprint and reduces the complexity of hardware lines. The BMS ensures faster charging of new batteries, power optimization, capacity and life extension of batteries, SoH estimation and temperature mitigation.

Referring now to the drawings and more particularly to FIGS. 1 through 8, in which similar reference characters denote corresponding features consistently throughout the figures, there are shown preferred embodiments.

FIG. 1A illustrates a block diagram of a Battery Management System (BMS) implemented in an electronic device, according to an exemplary embodiment.

In FIG. 1A, a BMS 102 is implemented in an electronic device 100. The BMS 102 includes a battery controller 104 and a charge pattern generator 106. The electronic device 100 includes a battery 108, a driver 110, an OS 112 and a user display 114. The communication between the BMS 102 and the OS 112 is bidirectional.

As the electronic device 100 is powered on, the battery controller 104 of the BMS 102 starts sensing and monitoring various functional parameters of the battery 108 such as current, voltage, temperature, capacity, State Of Charge (SoC), State of Health (SoH), or the like. The battery controller 104 is connected to the battery 108 and driver 110.

The charge pattern generator 106 obtains information of parameters pertaining to applications executed by the electronic device 100 based on a user input, heuristic information, ambience of the electronic device 100 and operational parameters of the electronic device 100. The applications installed in the electronic device 100 affect battery life, during their operation.

The heuristic information refers to the usage pattern of the electronic device 100 by the user, charge preferences of the user, activities of the electronic device 100, or the like. The operational parameters include current limit, thermal limit, processor temperature, charger temperature, minimum operating voltage, charger configuration settings, or the like. The charge pattern generator 106 obtains the above mentioned categorical information from the OS 112 of the electronic device 100. The charge pattern generator 106 also monitors the above mentioned information of parameters after obtaining parameters from the OS 112, for generating an optimal charging pattern of the battery 108.

The charge pattern generator 106 generates a pattern of charging the battery 108 of the electronic device 100. In an exemplary embodiment, the pattern corresponds to a variation in the rate of charging the battery 108, i.e., fast charging, slow charging, and normal charging respectively.

The charge pattern generator 106 causes to display the generated pattern on the screen of the electronic device 100, i.e. the user display 114, after generating the pattern. In an exemplary embodiment, the displayed pattern corresponds to suggestions provided to the user to charge the battery 108 or replace the battery 108. In an exemplary embodiment, the displayed pattern corresponds to a warning to charge the battery 108 for sustaining the present and future functionalities of the electronic device 100.

The charge pattern generator 106 detects an input performed by the user in response to the generated pattern displayed on the user display 114. Thereafter, an action is performed, based on the input performed by the user. In an exemplary embodiment, the action corresponds to charging the battery 108 of the electronic device 100, in which the user provides input, which triggers a command to charge the battery 108. In an exemplary embodiment, the action corresponds to scheduling the charging of the battery 108 in accordance to the user input. In an exemplary embodiment, the action corresponds to charging the battery 108 at a rate provided by the user as input. In an exemplary embodiment, the action may be charging the battery at a specific rate, based on the ambience of the electronic device 100. In an example, the ambience or surrounding environment of the electronic device 100 refers to temperature, humidity, precipitation, or the like in which the electronic device 100 operates.

FIG. 1A illustrates a limited overview of the electronic device 100, but it is to be understood that other embodiments are not limited thereto. The labels or names of the units are used only for illustrative purpose. Further, the electronic device 100 and BMS 102 can include any number of units or sub-units communicating among each other along with the other components. Likewise, the functionalities of one or more units may be combined by a single unit or may be distributed among each other in a manner different than described herein without departing from the scope of the present application.

Figure 1B:
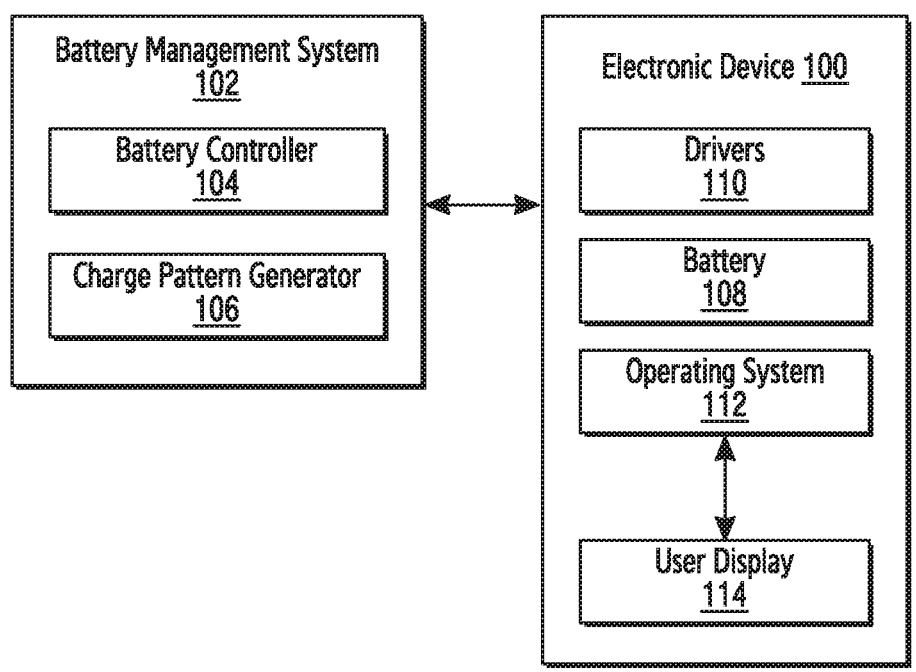
FIG. 1B illustrates a block diagram of a BMS external to the electronic device, according to an exemplary embodiment.

FIG. 1B illustrates a block diagram of a BMS external to the electronic device, according to an exemplary embodiment.

As depicted in FIG. 1B, the BMS 102 is external to the electronic device 100. The functionalities of the BMS 102 remain same as described with respect to FIG. 1A. The external implementation of the BMS 102 allows electronic devices with a conventional BMS to utilize the capabilities of the BMS 102.

Figure 2:
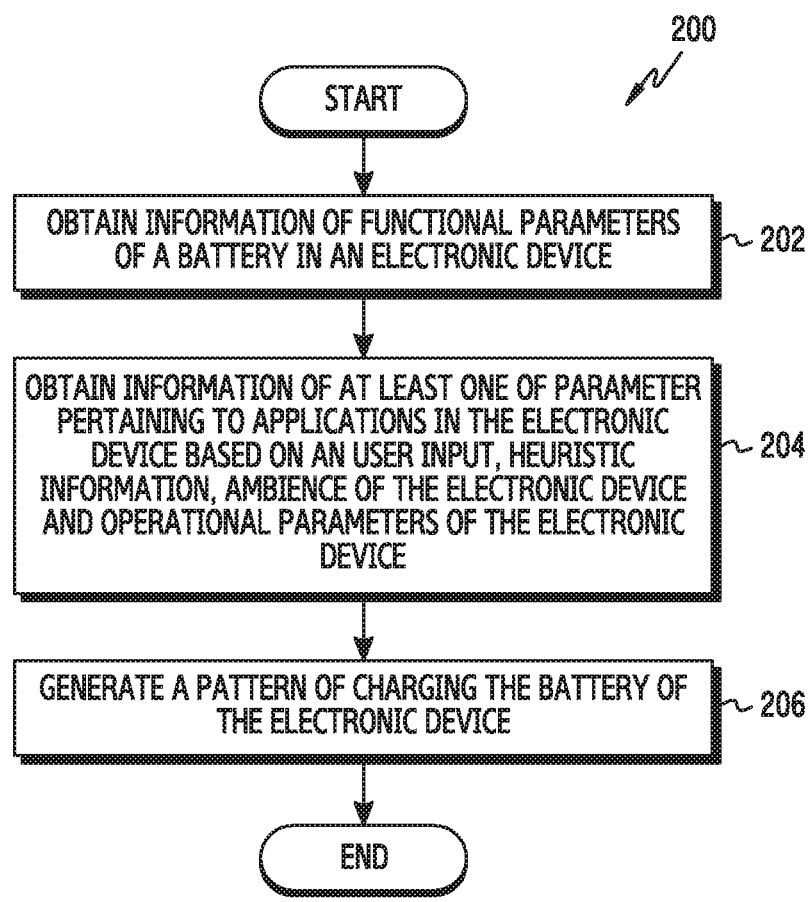
FIG. 2 illustrates a flowchart of a method of generating a pattern of charging a battery of the electronic device, according to an exemplary embodiment.

FIG. 2 illustrates a flowchart of a method of generating a pattern of charging a battery of the electronic device, according to an exemplary embodiment.

The BMS 102 enables the electronic device 100 to identify the optimal battery usage and battery charging patterns that ensure extension of the capacity and life of the battery 108. The BMS 102 determines the charge pattern and charge time necessary for sustaining the activities of the electronic device 100 and generates an optimal charging pattern and charging schedule respectively, for the battery 108. Therefore, the BMS 102 provides robust customizable and upgradable functionalities to the electronic device 100.

At step 202, the method 200 includes obtaining, by the battery controller 104, information of functional parameters of the battery 108 in the electronic device 100. The functional parameters include current, voltage, temperature, capacity, SoC, SoH, or the like.

At step 204, the method includes obtaining, by the charge pattern generator 106, information of parameters pertaining to applications installed in the electronic device 100 based on a user input, heuristic information, ambience of the electronic device 100 and operational parameters of the electronic device 100. The installed applications in the electronic device 100 may be based on a user input include alarm clock, calendar appointments, travel reservation, or the like. Execution of the applications has implications with regard to the current charge levels of the battery 108. The heuristic information refers to the usage pattern of the electronic device 100, past charging habits, or the like. Based on the heuristic information, the charge pattern generator 106 determines the future power consumption of the electronic device 100, and thereby ascertains the charging requirements of the battery 108. The charge pattern generator 106, through the OS 112, obtains the ambience of the electronic device 100 to generate an appropriate charging pattern. In an exemplary embodiment, the charge pattern generator 106, post obtaining the ambience of the electronic device 100, can recommend fast charging or slow charging. The operational parameters of the electronic device 100 includes current limit, thermal limit, processor temperature, charger temperature, minimum operating voltage, charger configuration settings, or the like. The charge pattern generator 106 obtains the operational parameters of the electronic device 100 from the OS 112. The operational parameters are vital in generating the optimal charging pattern.

The charge pattern generator 106 determines user activities such as user inputs, activity log, schedule and location of the electronic device 100 and stores the information as heuristic information. The charge pattern generator 106 obtains the operational parameters of the electronic device 100 to determine the present power requirements necessary to sustain the functionalities of the electronic device 100.

At step 206, the method includes generating, by the charge pattern generator 106, a pattern of charging the battery 108 of the electronic device 100. The pattern of charging the battery 108 is based on the information of functional parameters of the battery 108, parameter pertaining to applications in the electronic device 100 based on a user input, heuristic information, and ambience of the electronic device and the operational parameters of the electronic device.

The generating of the pattern of charging the battery 108 includes determining an optimal rate of charging the battery 108, i.e., slow charging or fast charging. The method may include recommending the generated charging pattern to the user. The charge pattern generator 106 predicts the charge requirements of the electronic device 100 based on heuristic information.

The pattern of charging the battery 108 includes constant current-constant voltage (CCCV), multistage constant current. i.e., constant voltage with variable cutoff voltage, multistage constant current, i.e., constant voltage (MSCC), multistage constant voltage with variable cut-off (MSCV), or the like. The magnitude of the maximum charging current determines whether the pattern of charging is slow charging or fast charging. The pattern of charging is also based on the context of life time (time to replacement) of the battery 108. Additional patterns for charging can also be generated (linearly decreasing current-based, pulsed current-based, or the like) based on specific requirements.

The BMS 102 provides weighted charging based on user preference. The BMS 102 provides customizable battery performance and improves customer experience and satisfaction. The BMS 102 allows replacement of static low battery limits with dynamic versions. The BMS 102 utilizes a gating system only for specific peripherals and applications, subject to unique battery state estimated. This improves the usability of the electronic device 100. The BMS 102 allows selective controlling (ON/OFF) of peripherals/applications depending on the available charge (state of charge) in the battery 108. The BMS 102 implements the logic in which a compromise is made between essential peripherals/applications and user preferences. The BMS 102 provides appropriate suggestions to the user with regards to the generated pattern for charging the battery of the electronic device 100. The BMS 102 detects any abnormality or defect in the battery 108. The BMS 1002 provides warning to the user about occurrence of potential catastrophe due to the battery 108 of the electronic device 100. This enhances the safety and robustness.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention. The method and other description provide a basis for a control program, which can be easily implemented by a microcontroller, microprocessor, or a combination thereof.

Figure 3:
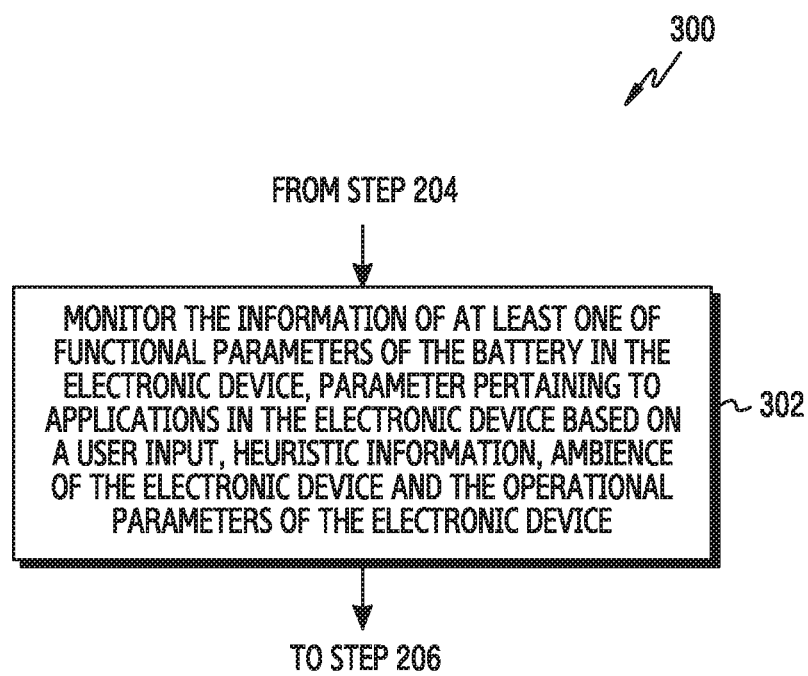
FIG. 3 illustrates a flowchart of a method of monitoring functional parameters of the battery of the electronic device, operational parameters and ambience of the electronic device, and heuristic information, according to an exemplary embodiment.

FIG. 3 illustrates a flowchart of a method of monitoring functional parameters of the battery of the electronic device, operational parameters and ambience of the electronic device, and heuristic information, according to an exemplary embodiment.

For the sake of brevity, the descriptions of steps 202-206 are omitted.

At step 302, the charge pattern generator 106 may monitor the information of at least one of functional parameters of a battery 108 of the electronic device 100, a parameter pertaining to installed applications in the electronic device 100 based on a user input, heuristic information, ambience of the electronic device 100 and the operational parameters of the electronic device 100.

The charge pattern generator 106 determines the present power necessary to sustain the functionalities of the electronic device 100. The determination of the present power requirements is based on active hardware modules and the installed applications currently being executed.

In an example, power requirements for an electronic device is determined based on remaining usage time (RUT) estimations. Based on the past discharge rate, future discharge rates are estimated with the assumption that user will use the device in the similar manner as he/she was using before. Remaining usage time is estimated with the formula RUT=(Battery % remaining)*(Time taken for 1% drop). Battery % remaining is read from fuel gauge directly. Time taken for 1% drop is calculated by averaging time taken for every battery % drop for the last 7 days (i.e., average of 42% to 41%, 41% to 40%, 40% to 39% etc.)

In an example, power requirements for an electronic device are determined based on a fuel gauge. The power estimation algorithm resides in a fuel gauge IC, which monitors current (or equivalently charge) entering or leaving a battery and calculates a battery state-of-charge. An operating system of the electronic device connects to the fuel gauge IC via an I2C bus and reads the state of charge. The state of charge allows the remaining power that can be delivered by the battery.

If it is determined that the battery 108 has sufficient charge to support the functionalities of the electronic device 100, the charge pattern generator 106 monitors the functional parameters of a battery of the electronic device 100, a parameter pertaining to installed applications in the electronic device 100, heuristic information, ambience of the electronic device 100 and the operational parameters of the electronic device 100. If the charge content of the battery 108 is insufficient to sustain the functionalities of the electronic device 100, then the BMS 102 determines whether the electronic device is connected to a power source for charging a battery. If the power source is not connected, the charge pattern generator 106 causes display of a warning indicating the user about the inability to sustain the functionalities of the electronic device 100 and necessity to charge the battery 108. If the power source is connected, then the charge pattern generator 106 determines the amount of charge, and the necessary time for which the battery 108 needs to be charged, for sustaining the functionalities of the electronic device 100. Thereafter, the charge pattern generator 106 dynamically generates an optimal charging pattern and schedule.

In an example scenario, the charge available in the battery 108, for sustaining the functionalities of the electronic device 100, is insufficient. Further, the user of the electronic device 100 is planning to travel and decides to charge the battery 108 while travelling. The BMS 102, while monitoring the parameters pertaining to the battery 108, such as SoC, and the applications installed in the electronic device 100, generates an optimal charging pattern.

In this scenario, a conventional BMS would perform fast charging. Unlike the conventional BMS, The BMS 102 initially obtains the information of the functional parameters of the battery 108, operational parameters of the electronic device 100, ambience of the electronic device 100, heuristic information, installed applications based on user input which have implications on the SoC, estimated travel time, or the like. Upon analyzing the information, The BMS 102 determines the optimal rate of charging the battery 108 based on travelling time, and a charging pattern is generated according to the rate of charging the battery and the travelling time.

This charging pattern can prevent a potential safety hazard in which there is risk of battery explosion, if the ambient temperature of the electronic device 100 was high, the battery 108 was being used for a long time, and the rate of charging the battery 108 was fast.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the present application. The method and other description provide a basis for a control program, which can be easily implemented by a microcontroller, microprocessor, or a combination thereof.

Figure 4:
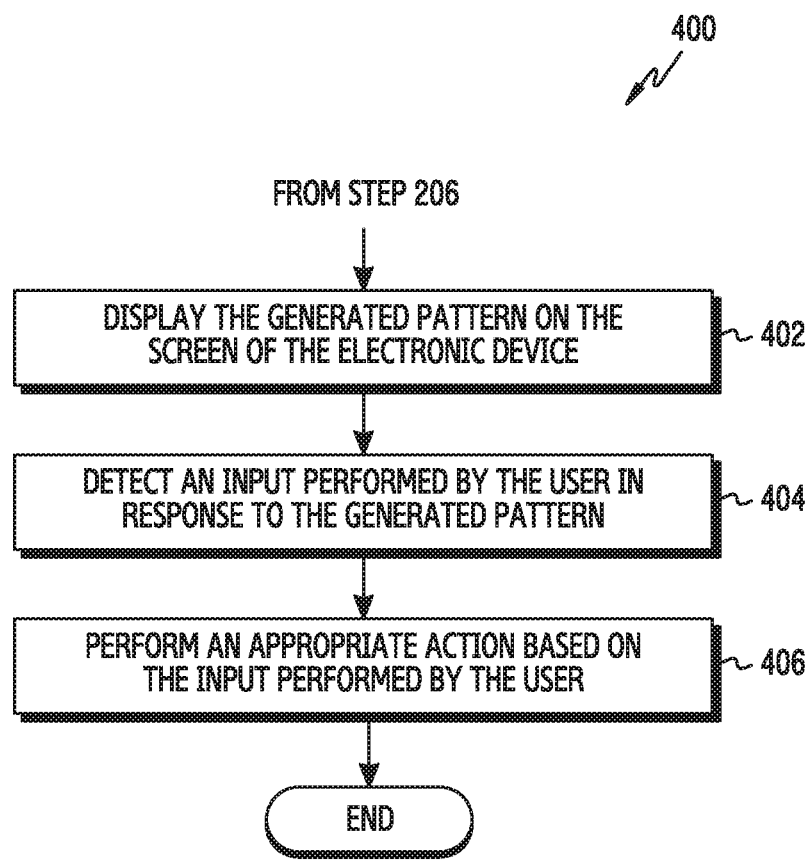
FIG. 4 illustrates a flowchart of a method of displaying the generated pattern of charging the battery of the electronic device, according to an exemplary embodiment.

FIG. 4 illustrates a flowchart of a method of displaying the generated pattern of charging the battery of the electronic device, according to an exemplary embodiment.

For the sake of brevity, the descriptions of steps 202-206 are omitted.

At step 402, the charge pattern generator 106 may control display of the generated pattern on the screen of the electronic device 100. The charge pattern generator 106 causes to display the generated pattern on the user display 114, once the pattern is generated. In an exemplary embodiment, the charge pattern generator 106 causes to display to the optimal charging pattern and schedule. The charge pattern generator 106 the charge pattern generator 106 causes display a warning about occurrence of potential hazard due to the battery temperature or ambience. At a particular battery temperature or ambience, an appropriate charging rate (slow or fast) reduced possibility of battery explosion.

In an example scenario, The BMS 102 allows detection of potential faults in the battery 108, which include monitoring of the battery temperature and battery voltage once the battery 108 is fully charged. The Open Circuit Potential (OCV) of the battery 108 can be monitored using a battery model. An abnormal rise in temperature of the battery 108 (compared to reference values) indicates an occurrence of a fault or internal short in the battery. The fault in the battery 108 leads to a reduction in the battery voltage for a particular SOC depicted in the OCV. The BMS 102 detects faults in the battery 108 by calibrating a rise in threshold temperature value, reduction in rest voltage of the battery 108 is fully charged, reduction in OCV value, or the like.

In an exemplary embodiment, the charge pattern generator 106 causes display of suggestions about the pattern for charging the battery 108. At step 404, the method includes detecting an input performed by the user in response to the generated pattern. At step 406, the method includes performing an appropriate action based on the input performed by the user. In an embodiment, the action corresponds to charging the battery 108.

In an example scenario, The BMS 102 monitors the functional parameters pertaining to the battery 108 and the installed applications in the electronic device 100 based on a user input, such as an alarm clock. The BMS 102 initially obtains the information of the functional parameters of the battery 108, operational parameters and ambience of the electronic device 100, user schedule (timing of the alarm), current and future activity of the electronic device 100, heuristic information (user sleep pattern), or the like. The BMS 102 generates a charging pattern, i.e., an optimal rate of charging the battery 108 based on user wake up time (alarm). Thereafter the charging pattern is displayed on the user display 114. The BMS 102, through the OS 112, suggests the user to select normal rate of charging the battery 108.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the present application. The method and other description provide a basis for a control program, which can be easily implemented by a microcontroller, microprocessor, or a combination thereof.

Figure 5:
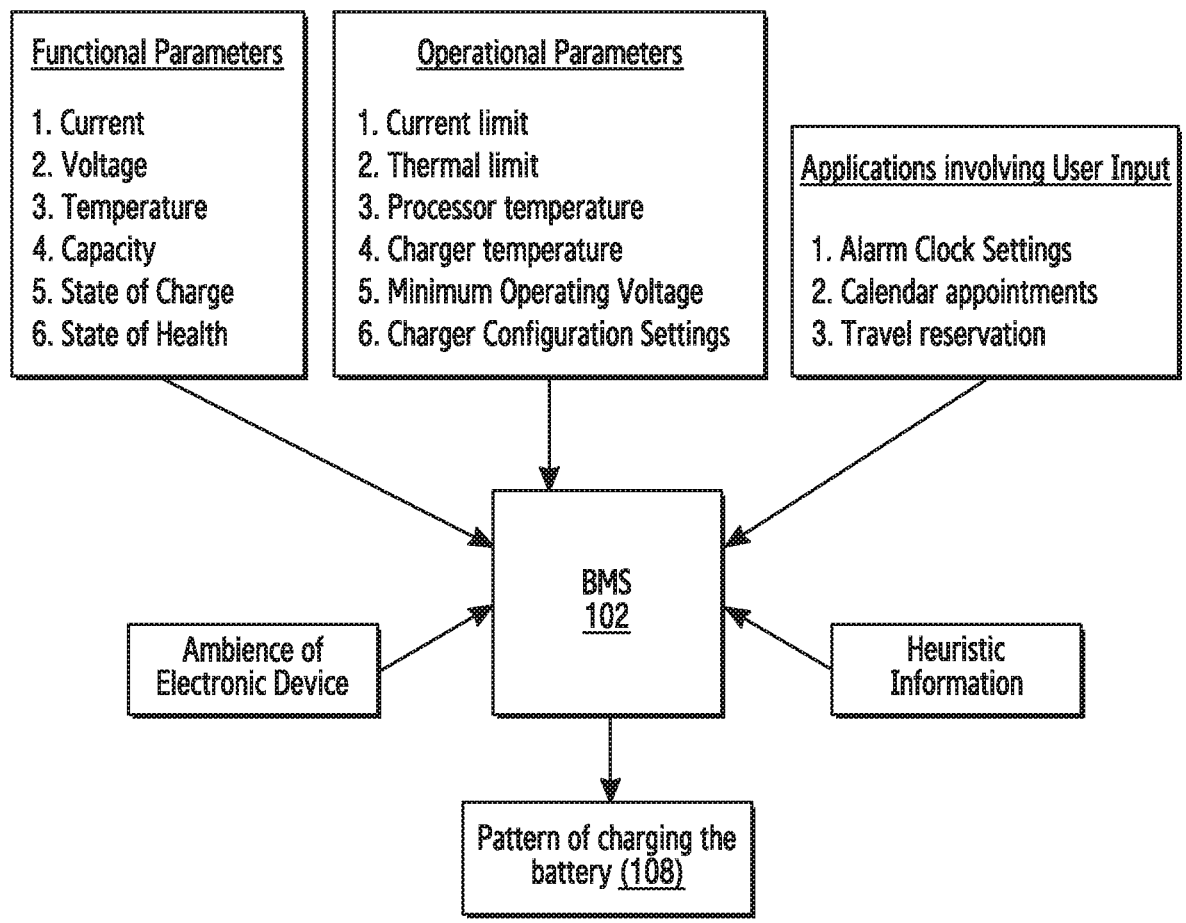
FIG. 5 illustrates a diagram of the functionality of a BMS, according to an exemplary embodiment.

FIG. 5 illustrates a diagram of the functionality of a BMS, according to an exemplary embodiment.

As depicted in FIG. 5, The BMS 102 obtains the various functional parameters pertaining to the battery 108, such as current, voltage, temperature, capacity, SoC, SoH, or the like. The BMS 102 obtains the various operational parameters pertaining to the electronic device 100 such as current limit, thermal limit, processor temperature, charger temperature, minimum operating voltage, charger configuration settings, or the like. The BMS 102 obtains parameters pertaining to applications installed in the electronic device 100 based on a user input such as alarm clock settings, calendar appointments, travel reservation, or the like. The BMS 102 obtains heuristic information and ambience of the electronic device 100. Such information is obtained by The BMS 102 to generate an optimal charging pattern for the battery 108 of the electronic device 100.

In an example scenario, The BMS 102 determines that at 10:00 PM, the user sets an alarm for 7:00 AM the following day. The BMS 102 estimates the functional parameters pertaining to the battery 108 such as current, voltage, temperature, and SoC. The BMS 102 determines through the SoC that the time required to fully charge the battery 108 from a drained state is 2-3 hours with normal charging. The available charging time is 9 hours. Considering a scenario: If in the electronic device is connected to a power source, then the battery 108 is subjected to constant voltage until the battery 108 is fully charged, and when the SoC drops below a maximum (since the electronic device 100 is ON, there is always a drain), the charging is initiated. As such, there is toggling of constant voltage charging, which is detrimental to the life of the battery 108.

Considering another scenario: If the battery 108 is fully charged prior to a wake up time, then the charge of the battery 108 at wake up time is less than 100%. The BMS 102 generates a pattern of charging the battery 108 based on the scenarios. The BMS 102 performs charging at a nominal rate and time to start charging is set at: 3:30 AM. If The BMS 102 determines that the SOC level of the battery 108 is less than 50%, then the electronic device 100 is charged to 50% and charging is terminated. The charging is restarted at 3:30 AM.

Figure 6:
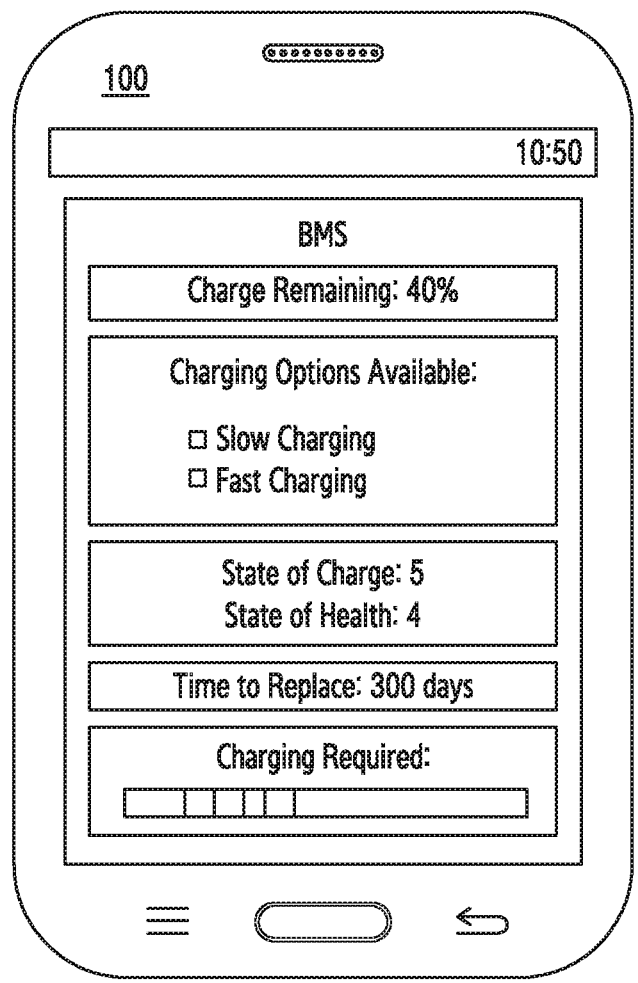
FIG. 6 illustrates a user interface displaying the pattern of charging the battery of the electronic device and other parameters pertaining to the state of the battery of the electronic device, according to an exemplary embodiment.

FIG. 6 illustrates a user interface displaying the pattern of charging the battery 108 of the electronic device 100 and other parameters pertaining to the state of the battery 108 of the electronic device 100, according to an exemplary embodiment.

As depicted in FIG. 6, the user interface displays a set of parameters pertaining to the battery 108 of the electronic device 100 such as percentage of charge remaining, charging options available, SoC, SoH, time to replace, and requirement of charge. It is to be understood that the user interface also displays other parameters, which have not been depicted in FIG. 6. The charge pattern generator 106 allows displaying the generated pattern for charging the battery 108 on the screen of the electronic device 100 through the user interface. In an example, the percentage of charge remaining in the battery 108 is obtained by the battery controller 104 and displayed using the OS 112, through the charge pattern generator 106, on the user display 114.

Figure 7:
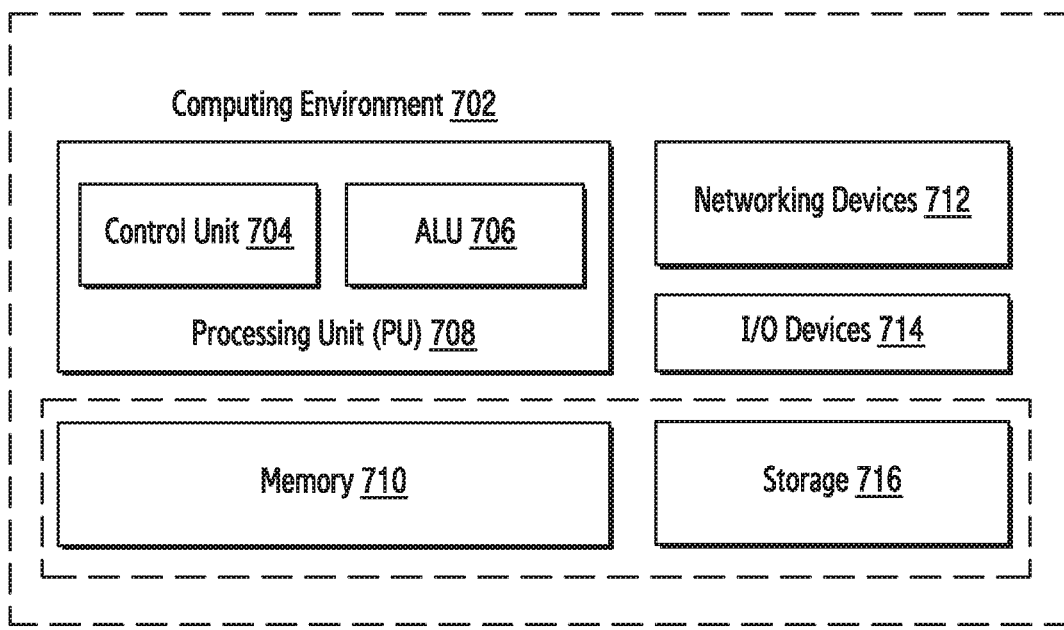
FIG. 7 illustrates a block diagram of a BMS, according to an exemplary embodiment.

FIG. 7 illustrates a block diagram of a BMS, according to an exemplary embodiment.

As depicted in the FIG. 7, the computing environment 702 comprises at least one processing unit 708 that is equipped with a control unit 704 and an Arithmetic Logic Unit (ALU) 706, a memory 710, a storage unit 716, plurality of networking devices 712 and a plurality Input output (I/O) devices 714. The processing unit 708 is responsible for controlling operations of the BMS. The processing unit 708 receives commands from the control unit in order to perform its processing. Further, any logical and arithmetic operations involved in the execution of the instructions are computed with the help of the ALU 706.

The overall computing environment 702 can be composed of multiple homogeneous and/or heterogeneous cores, multiple CPUs of different kinds, special media and other accelerators. Further, the plurality of processing units 708 may be located on a single chip or over multiple chips.

The computer readable instructions required for the implementation are stored in either the memory unit 710 or the storage 716 or both. At the time of execution, the instructions may be fetched from the corresponding memory 710 or storage 716, and executed by the processing unit 708.

In case of any hardware implementations various networking devices 712 or external I/O devices 714 may be connected to the computing environment to support the implementation through the networking unit and the I/O device unit.

Figure 8:
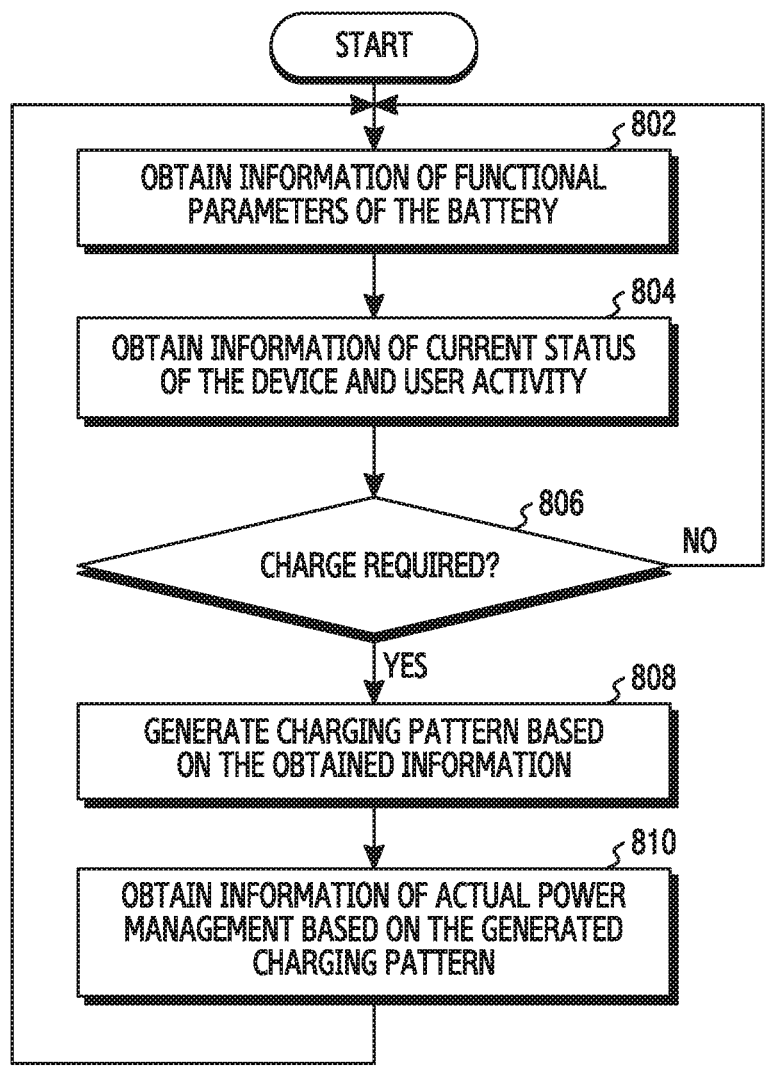
FIG. 8 is a flowchart illustrating a method of generating a charging pattern of the battery of the electronic device, according to an exemplary embodiment.

FIG. 8 is a flowchart illustrating a method of generating a charging pattern of the battery of the electronic device, according to an exemplary embodiment.

As described above, according to embodiments of the disclosure, the BMS 102 facilitates bidirectional communication between the BMS 102 and the OS 112 of the electronic device 100. The BMS 102 enables the electronic device 100 to identify the optimal battery charging patterns that ensure extension of the capacity and life of the battery 108. The BMS 102 determines a period of time during which the battery is capable of supporting operation of the electronic device 100 in a current status, and generates an optimal charging pattern including charging schedule in consideration of the schedule of the user obtained from applications of the electronic device 100 such as an alarm clock, calendar app, notes and so on.

At step 802, the method includes obtaining information of functional parameters of the battery 108 in the electronic device 100. The functional parameters include information representing the status of the battery such as current, voltage, temperature, capacity, SoC, SoH, or the like. These functional parameters may be obtained by the controller 104 but not limited hereinto. The controller 104 may be omitted or incorporated as at least one processor of the electronic device 100. Further, the functional parameter may be sensed through a fuel gauge IC separately implemented from the BMS 102 or incorporated thereto.

At step 804, the current status of the electronic device 100 and user activity are obtained. The information of current status of the electronic device 100 is the information related to operation of the electronic device 100, which may include information such as parameters pertaining to applications in the electronic device including a number and types of applications currently operated in the electronic device 100, ambience of the electronic device 100 such as temperature, luminance, day/night of an environment in which the electronic device 100 operates and operational parameters of the electronic device 100 such as current limit, thermal limit, processor temperature, charger temperature, minimum operating voltage, charger configuration settings. The information of the user activity is information obtained by the electronic device 100 with regard to the user activity, which may be inputted or generated by the user while using the electronic device 100. The information of the user activity may include information such as actual time and period of charging the battery by the user, time and usage pattern of the electronic device 100 and information inputted by the user through applications of the electronic device. Exemplary information with regard to the user activity is user inputs, activity log, alarm clock settings, calendar appointment, travel reservation or the like.

The heuristic information refers to previously obtained information while the electronic device is operating and used by the user. The heuristic information may be information related to previously stored functional parameters of the battery, previous status of the electronic device and/or previous user activity. The heuristic information is further used to generate the charging pattern in comparison or with respect to the information obtained at step 802 and 804. Exemplary heuristic information is information regarding the usage pattern of the electronic device 100, past charging habits, or the like. Based on the heuristic information, the charge pattern generator 106 may determine the future power consumption of the electronic device 100, and thereby ascertains the charging requirements of the battery 108. The charge pattern generator 106, through the OS 112, may further obtain the ambience of the electronic device 100 to generate an appropriate charging pattern. The charge pattern generator 106 stores the information obtained at the steps 802 and 804 as heuristic information.

At step 806, the charge pattern generator 106 determines a period of time during which the battery is capable of supporting operation of the electronic device based on the obtained information at steps 802 and 804. That is, the charge pattern generator 106 determines how long the battery can support operation of the electronic device 100 if the electronic device continues the current status of operation or reduces the power consumption if necessary. The charge pattern generator 106 may further determine the present power requirements necessary to sustain the functionalities of the electronic device 100.

If charge of the battery is required, the charge pattern generator 106 at step 808 generates charging pattern including information regarding when and how the charge of the battery is to be performed. The charging pattern may include time, period, rate, interval, extent for charging the battery and the like. The charging pattern may include combinations of any of these information. The rate of charging may be slow charging, normal charging or fast charging for example.

The pattern of charging the battery 108 includes constant current-constant voltage (CCCV), multistage constant current. i.e., constant voltage with variable cutoff voltage, multistage constant current, i.e., constant voltage (MSCC), multistage constant voltage with variable cut-off (MSCV), or the like. The magnitude of the maximum charging current determines whether the pattern of charging is slow charging or fast charging. The pattern of charging is also based on the context of life time (time to replacement) of the battery 108. Additional patterns for charging can also be generated (linearly decreasing current-based, pulsed current-based, or the like) based on specific requirements.

The BMS 102 provides weighted charging based on user preference. The BMS 102 provides customizable battery performance and improves customer experience and satisfaction. The BMS 102 allows replacement of static low battery limits with dynamic versions. The BMS 102 utilizes a gating system only for specific peripherals and applications, subject to unique battery state estimated. This improves the usability of the electronic device 100. The BMS 102 allows selective controlling (ON/OFF) of peripherals/applications depending on the available charge (state of charge) in the battery 108. The BMS 102 implements the logic in which a compromise is made between essential peripherals/applications and user preferences. The BMS 102 provides appropriate suggestions to the user with regards to the generated pattern for charging the battery of the electronic device 100. The BMS 102 detects any abnormality or defect in the battery 108. The BMS 1002 provides warning to the user about occurrence of potential catastrophe due to the battery 108 of the electronic device 100. This enhances the safety and robustness.

At step 810, the charge pattern generator 106 further obtains information of actual power management generated during operation of the electronic device 100 based on the generated charging pattern. The information of actual power management may be stored as operational information of the electronic device 100 and/or as one of the heuristic information.

As described above, the various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the present application. The method and other description provide a basis for a control program, which can be implemented by a microcontroller, microprocessor, or a combination thereof.

The embodiments disclosed herein can be implemented through at least one software program running on at least one hardware device and performing network management functions to control the elements. The elements shown in the FIGS. 1 through 8 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method of managing a battery of an electronic device, the method comprising:
    obtaining first information on functional parameters for indicating a status of the battery;
    obtaining second information on user activity for the electronic device;
    obtaining third information on an operational status of the electronic device;
    identifying that a charge of the battery is required based on the first information, the second information, and the third information;
    determining at least one charging scheme to charge the battery based on the first information, the second information, and the third information after identifying that the charge of the battery is required; and
    performing an action for charging the battery according to the determined at least one charging scheme.

2. The method of claim 1, further comprising:
    obtaining heuristic information related to at least one of previous functional parameters of the battery, a previous status of the electronic device, and previous user activity,
    wherein the determining the at least one charging scheme comprises determining the at least one charging scheme based on the heuristic information.

3. The method of claim 2, further comprising:
    obtaining information of actual power management of the electronic device based on the at least one charging scheme to be stored as the heuristic information.

4. The method of claim 1, wherein the identifying that the charge of the battery is required comprises:
    determining a period of time during which the battery is capable of supporting an operation of the electronic device based on the first information, the second information, and the third information;
    determining a power required by the electronic device for maintaining functionalities of the electronic device; and
    identifying that the charge of the battery is required based on the period of time and the power required by the electronic device.

5. The method of claim 4, further comprising:
    detecting that a power source is not connected to the electronic device; and
    displaying, on a screen of the electronic device, a message for indicating to charge the battery of the electronic device in response to detecting the power source is not connected.

6. The method of claim 1, wherein priorities are set amongst the first information, the second information, and the third information, and
    wherein the determining the at least one charging scheme comprises determining the at least one charging scheme based on the priorities for the first information, the second information, and the third information.

7. The method of claim 1, wherein the at least one charging scheme comprises at least one of a time, a period, a rate, an interval, and an extent for the charge of the battery to be performed.

8. The method of claim 1, wherein the operational status of the electronic device includes at least one of an ambience of the electronic device and operational parameters of the electronic device,
    wherein the user activity comprises at least one of an actual time and a period of charging the battery, a time and a period of using the electronic device, and information inputted by a user through applications of the electronic device, and
    wherein the operational parameters of the electronic device comprise at least one of a current limit, a thermal limit, a processor temperature, and a minimum operating voltage.

9. An electronic device comprising:
    a memory configured to store computer-readable instructions; and
    a processor configured to execute the computer-readable instructions, which when executed cause a battery management system (BMS) to:
        obtain first information on functional parameters for indicating a status of a battery of the electronic device,
        obtain second information on user activity for the electronic device,
        obtain third information on an operational status of the electronic device,
        identify that a charge of the battery is required based on the first information, the second information, and the third information,
        determine at least one charging scheme to charge the battery based on the first information, the second information, and the third information after identifying that the charge of the battery is required, and
        perform an action for charging the battery according to the determined at least one charging scheme.

10. The electronic device of claim 9, wherein the processor is further configured to obtain heuristic information related to at least one of previous functional parameters of the battery, a previous status of the electronic device, and previous user activity, and
    wherein, in order to determine the at least one charging scheme, the processor is further configured to determine the at least one charging scheme based on the heuristic information.

11. The electronic device of claim 10, wherein the processor is further configured to obtain information of actual power management of the electronic device based on the at least one charging scheme to be stored as the heuristic information.

12. The electronic device of claim 9, wherein, in order to identify that the charge of the battery is required, the processor is further configured to:
   determine a period of time during which the battery is capable of supporting an operation of the electronic device based on the first information, the second information, and the third information,
   determine a power required by the electronic device for maintaining functionalities of the electronic device, and
   identify that the charge of the battery is required based on the period of time and the power required by the electronic device.

13. The electronic device of claim 12, further comprising a screen,
   wherein the processor is further configured to:
      detect that a power source is not connected to the electronic device, and
      control the screen to display a message for indicating to charge the battery of the electronic device in response to detecting the power source is not connected.

14. The electronic device of claim 9, wherein the processor is further configured to set priorities amongst the first information, the second information, and the third information, and
   wherein, in order to determine the at least one charging scheme, wherein the processor is further configured to determine the at least one charging scheme based on the priorities for the first information, the second information, and the third information.

15. A non-transitory computer-readable medium having stored thereon computer-executable instructions that when executed by a processor of an electronic device cause the processor to perform a method of managing a battery of the electronic device, the method comprising:
   obtaining first information on functional parameters for indicating a status of the battery;
   obtaining second information on user activity for the electronic device;
   obtaining third information on an operational status of the electronic device;
   identifying that a charge of the battery is required based on the first information, the second information, and the third information;
   determining at least one charging scheme to charge the battery based on the first information, the second information, and the third information after identifying that the charge of the battery is required; and
   performing an action for charging the battery according to the determined at least one charging scheme.

16. The non-transitory computer-readable medium of claim 15, wherein the method further comprises obtaining heuristic information related to at least one of previous functional parameters of the battery, a previous status of the electronic device, and previous user activity, and
   wherein the determining the at least one charging scheme comprises determining the at least one charging scheme based on the heuristic information.

17. The non-transitory computer-readable medium of claim 15, wherein the method further comprises:
   obtaining information of actual power management of the electronic device based on the at least one charging scheme to be stored as the heuristic information.

18. The non-transitory computer-readable medium of claim 15, wherein the identifying that the charge of the battery is required comprises:
   determining a period of time during which the battery is capable of supporting an operation of the electronic device based on the first information, the second information, and the third information;
   determining a power required by the electronic device for maintaining functionalities of the electronic device; and
   identifying that the charge of the battery is required based on the period of time and the power required by the electronic device.

19. The non-transitory computer-readable medium of claim 18, further comprising:
   detecting that a power source is not connected to the electronic device; and
   displaying, on a screen of the electronic device, a message for indicating to charge the battery of the electronic device in response to detecting the power source is not connected.

20. The non-transitory computer-readable medium of claim 15, wherein priorities are set amongst the first information, the second information, and the third information, and
   wherein the determining the at least one charging scheme comprises determining the at least one charging scheme based on the priorities for the first information, the second information, and the third information.

21. The method of claim 1, wherein the determining the at least one charging scheme comprises:
   identifying an amount to be charged in the battery at a time that a power source is connected based on the obtained functional parameters of the battery;
   identifying a time of period during which the electronic device is connected to the power source based on the obtained user activity; and
   determining at least one charging rate that is available based on the identified amount to be charged and the identified time of period.

22. The method of claim 21, wherein the identifying the time of period during which the electronic device is connected to the power source comprises:
   identifying an input on a wake-up time for an alarm clock application stored in the electronic device; and
   obtaining the time of period based on a difference between the time that the power source is connected and the wake-up time.

23. The method of claim 1, wherein the determining the at least one charging scheme comprises determining a first charging scheme with a first charging rate and a second charging scheme with a second charging rate that is different from the first charging rate, and
   wherein the method further comprises:
      displaying the first charging scheme the second charging scheme on a screen of the electronic device;
      detecting a user input for a first scheme between the first scheme and a second scheme; and
      performing the action for charging the battery according to the first scheme in response to detecting the user input.

24. The electronic device of claim 9, wherein, in order to determine the at least one charging scheme, the processor is further configured to:
   identify an amount to be charged in the battery at a time that a power source is connected based on the obtained functional parameters of the battery, identify a time of period during which the electronic device is connected to the power source based on the obtained user activity, and determine at least one charging rate that is available based on the identified amount to be charged and the identified time of period.

25. The electronic device of claim 24, wherein, in order to identify the time of period during which the electronic device is connected to the power source, the processor is further configured to:

identify an input on a wake-up time for an alarm clock application stored in the electronic device, and obtain the time of period based on a difference between the time that the power source is connected and the wake-up time.

26. The electronic device of claim 9, further comprising a screen, wherein, in order to determine the at least one charging scheme, the processor is further configured to determine a first charging scheme with a first charging rate and a second charging scheme with a second charging rate that is different from the first charging rate, and wherein the processor is further configured to:

control the screen to display the first charging scheme the second charging scheme, detect a user input for a first scheme between the first scheme and a second scheme, and perform the action for charging the battery according to the first scheme in response to detecting the user input.

27. The non-transitory computer-readable medium of claim 15, wherein the determining the at least one charging scheme comprises:

identifying an amount to be charged in the battery at a time that a power source is connected based on the obtained functional parameters of the battery;

identifying a time of period during which the electronic device is connected to the power source based on the obtained user activity; and determining at least one charging rate that is available based on the identified amount to be charged and the identified time of period.

28. The non-transitory computer-readable medium of claim 27, wherein the identifying the time of period during which the electronic device is connected to the power source comprises:

identifying an input on a wake-up time for an alarm clock application stored in the electronic device; and obtaining the time of period based on a difference between the time that the power source is connected and the wake-up time.

29. The non-transitory computer-readable medium of claim 15, wherein the determining the at least one charging scheme comprises determining a first charging scheme with a first charging rate and a second charging scheme with a second charging rate that is different from the first charging rate, and wherein the method further comprises:

displaying the first charging scheme the second charging scheme on a screen of the electronic device;

detecting a user input for a first scheme between the first scheme and a second scheme; and performing the action for charging the battery according to the first scheme in response to detecting the user input.

30. The electronic device of claim 9, wherein the operational status of the electronic device includes an ambience of the electronic device and operational parameters of the electronic device, wherein the user activity comprises at least one of an actual time and a period of charging the battery, a time and a period of using the electronic device, and information inputted by a user through applications of the electronic device, and wherein the operational parameters of the electronic device comprise at least one of a current limit, a thermal limit, a processor temperature, and a minimum operating voltage.

31. The non-transitory computer-readable medium of claim 15, wherein the operational status of the electronic device includes an ambience of the electronic device and operational parameters of the electronic device, wherein the user activity comprises at least one of an actual time and a period of charging the battery, a time and a period of using the electronic device, and information inputted by a user through applications of the electronic device, and wherein the operational parameters of the electronic device comprise at least one of a current limit, a thermal limit, a processor temperature, and a minimum operating voltage.

* * * * *